April 29, 1969

C. F. KNUTSON 3,440,875

METHOD FOR DETERMINING THE STRESS ANISOTROPY
IN A HORIZONTAL PLANE

Filed June 20, 1967

Sheet _1_ of 2

INVENTOR.
CARROLL F. KNUTSON

BY Henry H. Huth

ATTORNEY

United States Patent Office
3,440,875
Patented Apr. 29, 1969

3,440,875
METHOD FOR DETERMINING THE STRESS ANISOTROPY IN A HORIZONTAL PLANE
Carroll F. Knutson, Ponca City, Okla., assignor to Continental Oil Company, Ponca City, Okla., a corporation of Delaware
Filed June 20, 1967, Ser. No. 647,413
Int. Cl. E21b 47/00
U.S. Cl. 73—151          9 Claims

ABSTRACT OF THE DISCLOSURE

The invention disclosed in this specification is a method for determining the stress anisotropy in a horizontal plane of a subterranean formation by emplacing a disc of photoelastic material on the bottom of a hole and thereafter cutting a core sample which includes a portion of said photoelastic disc. Stress bands in the disc after it is returned to the surface will indicate the strain undergone by the core between the time it was in its natural state and its condition of no stress at the surface.

---

This invention relates to the art of geophysical exploration and more particularly to the determination of stresses existing in a subterranean formation.

It has been known in the past that a knowledge of pre-existing stresses in subsurface geological formations can be quite useful in determining the presence of structure such as salt domes that can lead to the discovery of petroleum deposits.

In accordance with the present invention, the stress anisotropy in a horizontal plane of a subterranean formation is determined by placing a fluid layer of photoelastic plastic on the bottom of a hole drilled to the desired depth in said formation, allowing the photoelastic plastic to harden and become attached to the rock at the bottom of said hole, cutting a core sample which includes a portion of said photoelastic plastic, removing said core and attached plastic to the surface, observing the stress bands present in the photoelastic plastic while the plastic is still attached to the rock, and relating the stress-strain relationship of the plastic to that of the rock. Alternatively, a preferred method would be to include a disc of preformed photoelastic plastic, which had previously been temporarily subjected to a given amount of stress so as to determine the effect of said stress upon the plastic, along with a sufficient amount of the fluid layer of photoelastic plastic to allow adherence of the plastic to the rock. The remaining steps in the preferred method are identical with the method previously set forth above.

Figure 1:
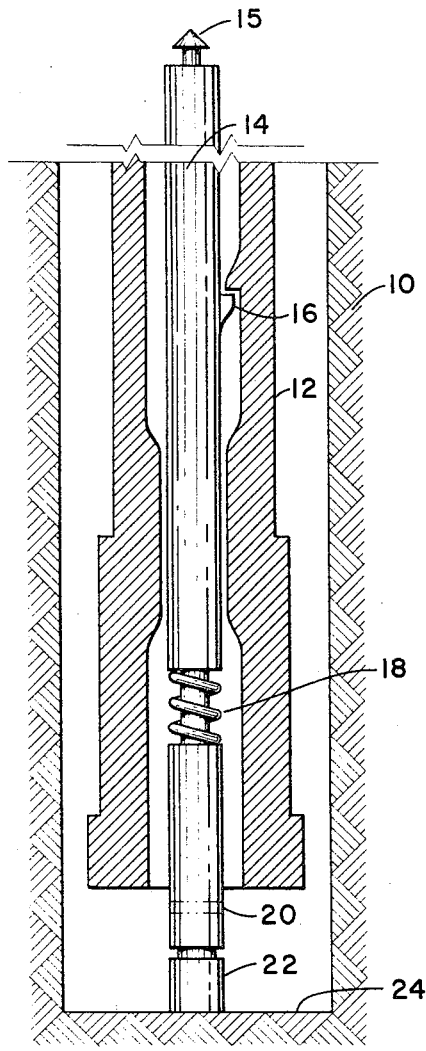
FIGURE 1 is a view of a borehole and a cutting mechanism shown in cross section with the device of this invention shown in full view.

Referring now to the drawings and in particular to FIGURE 1, a borehole 10 having a relatively smooth borehole bottom 24 contains a cutting means 12. A wand 14 having a connecting means 15, a locking means 16, a biasing means 18, an orienting means 20, and a cementing head 22 is positioned within cutting means 12.

Figure 2:
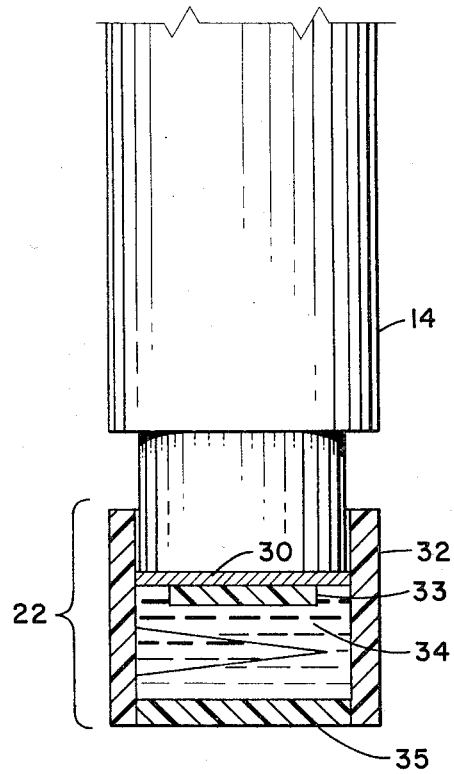
FIGURE 2 is a view of the device of this invention showing the cementing head containing liquid plastic solutions and the lower portion of the wand.

In FIGURE 2, the cementing head 22 has a preformed photoelastic plastic disc 33 positioned in contact with a layer of liquid photoelastic plastic 34. The liquid photoelastic plastic is retained by protector 32 and breakable plastic retaining member 35. A shear disc 30 connects cementing head 22 with the wand 14.

Figure 3:
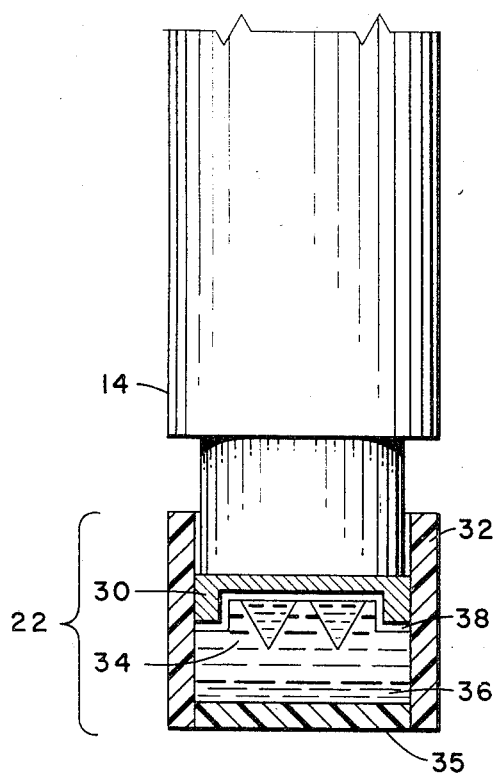
FIGURE 3 is a view of the device of this invention showing the cementing head containing plastic solutions and a preparatory compound and showing the lower portion of the wand.

In FIGURE 3, liquid photoelastic plastic 34 is positioned adjacent to a mold release layer 38. A preparatory compound 36 is positioned between the photoelastic plastic 34 and a breakable plastic retaining member 35.

Figure 4:
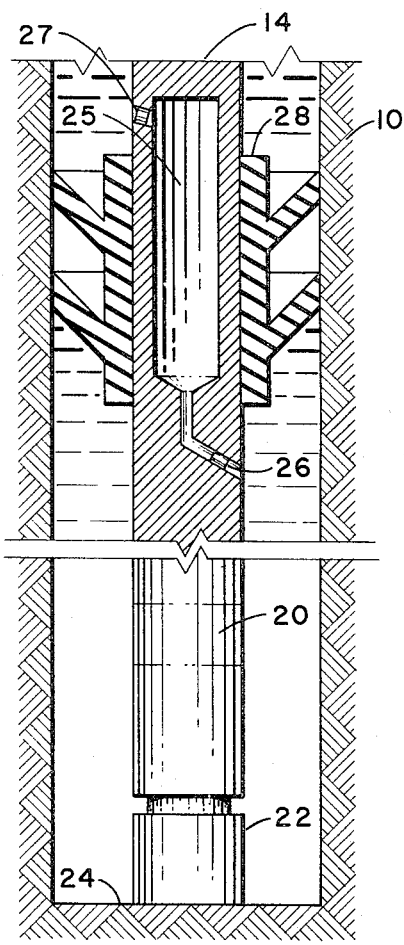
FIGURE 4 is a view of the device of this invention showing an alternate type of wand for use with a weight of mud.

In FIGURE 4, the wand 14 has a cavity 25, a valve 26 and a valve 27. Swab cup assembly 28 is positioned around the wand 14 and is in contact with the borehole wall 10.

The operation of the invention as shown by FIGURE 1 is as follows:

A relatively smooth borehole bottom 24 is cut in a borehole by cutting member 12. Cutting member 12 is then raised a specific distance off the borehole bottom 24, said distance being dependent upon the design of the wand 14. Wand 14 is positioned inside cutting means 12 and locked in place by locking means 16. After the wand 14 is locked in place, the cutting means 12 is lowered so as to force cementing head 22 against the borehole bottom 24. Cementing head 22 is biased toward the borehole bottom 24 by biasing means 18. The downward force exerted on the cementing head 22 causes breakable plastic retaining member 35 to break and liquid photoelastic plastic 34 (which is comprised of plastic bags of two or more solutions required to initiate and catalyze an epoxy or polyester plastic, said plastic bags break as a result of the aforementioned downward force) comes in contact with the rock constituting the borehole bottom 24 and adheres to said rock. Orienting means 20 (any well-known device such as the Sperry single shot) is activated to record the direction of stress. After the photoelastic plastic becomes set and securely adhered to the rock constituting the borehole bottom 24, the wand 14 and cementing head 22 are removed from cutting means 12. A wire line core barrel (not shown) is placed inside cutting member 12 and a core is cut which contains a portion of the photoelastic plastic adhered to said core of rock. As the core is cut the stress is transferred to the photoelastic plastic from the rock. The core (and photoelastic plastic) is removed to the surface where the stress bands of the photoelastic plastics are observed by techniques well known in the art. The stress bands of the photoelastic plastic record the strain undergone by the core between the time it was in its natural state (i.e., close to the state of stress of the surrounding rock) and its removal to a condition of no stress at the surface. The amount of stress can be evaluated by calibrating the photoelastic plastic to evaluate the strain undergone by the rock, and then a stress-strain curve can be run on the rock to obtain the stress state.

The operation according to FIGURE 4 is as follows:

After a smooth bottom is cut in borehole bottom 24, the cutting means (not shown) is removed. Wand 14, having a cavity 25 with a valve 26 opening above swab cup assembly 28 and valve 27 opening below swab cup assembly 28, and having orienting means 20 and cementing head 22 attached, as shown in the figure, is positioned on the bottom of the borehole. After the wand and associated equipment is positioned as previously described, drilling mud from the drilling operation will be present above and below swab cup assembly 28. Valve 26 is actuated by any well known means: such as, electrically or mechanically by a time dependent means, such as a clock or other device well known in the art. Upon actuation of valve 26 mud (other fluids such as water will also work) flows into cavity 25 and causes a decrease in pressure below the swab cup assembly 28. This decrease in pressure causes the wand and associated equipment to be forced downward.

The downward force causes breakable plastic retaining member 35 to break and release preparatory compound 36 which makes the rock preferentially plastic wet and allows adherence of the photoelastic plastic to the rock. The downward force also causes photoelastic plastic 34 to be released from its containers. The photoelastic plastic becomes adhered to the preferentially plastic wet rock and in a matter of a few minutes becomes hardened into a layer of solid photoelastic plastic. After the photoelastic plastic becomes hardened, valve 27 is opened in a manner similar to valve 26 in order to equalize the pressure above and below swab cup assembly 28. The wand and associated equipment is then removed from the borehole. A mold release agent 38 prevents the photoelastic plastic from adhering to the wand and allows the easy removal of the wand from the borehole without disturbing the hardened photoelastic plastic. After the wand is removed, a core cutter is lowered into the hole and a core is cut which contains some rock from the bottom of the hole and a portion of the photoelastic plastic adhered to said rock. The remaining steps of the operation are identical to those described in the operation according to FIGURE 1.

The operation according to FIGURE 4 is useful where a larger core than that which can be obtained by the operation according to FIGURE 1 is desired. The disadvantage is that the cutting means must be removed prior to emplacing the photoelastic plastic in the hole. Both operations offer advantages not previously available.

Examples of materials useful as the photoelastic plastic are acrylic resins: such as, methyl methacrylate, polymethyl methacrylate and ethyl acrylate; polyester resins: such as, the reaction product of ethylene glycol and maleic acids; and epoxy resins: such as, the reaction product of bisphenol A and epichlorohydrin.

Examples of materials useful as the mold release agent are polypropylene and polyurethane.

Examples of materials useful as the preparatory compound are methyl chlorosilane and vinyl chlorosilane.

Although only certain specific materials and embodiments of the invention have been shown and described, it must be understood that there are many modifications thereof which may be readily brought about; therefore, the invention is not to be restricted except insofar as indicated by the scope of the claims.

What is claimed is:

1. A method for determining the stress anisotropy in the horizontal plane of a subsurface formation comprising:
    (a) drilling a hole in said formation;
    (b) placing a layer of photoelastic plastic on the bottom of said hole and allowing said plastic to harden;
    (c) cutting a core from the bottom of said hole which includes a portion of the plastic material;
    (d) removing the core to the surface;
    (e) measuring the stress bands of the photoelastic plastic; and
    (f) determining the stress-strain curve of the core by calibrating the strain undergone by the plastic and relating said strain to the strain undergone by the core.

2. The method of claim 1 wherein a portion of the photoelastic plastic is a pre-formed disc.

3. The method of claim 1 including the additional step of orienting said plastic prior to cutting the core whereby the direction of the stresses within said subsurface formation is determined.

4. The method of claim 3 wherein the breaking of said containers is accomplished by applying a downward force.

5. The method of claim 4 wherein said downward force is applied by filling said hole with drilling mud.

6. The method of claim 4 wherein said downward force is created by applying hydraulic pressure.

7. The method of claim 4 wherein said downward force is created by applying mechanical pressure.

8. The method of claim 1 wherein the plastic is a multi-component plastic contained in individual breakable containers and including the additional step of breaking said containers after the placement in said hole and prior to cutting the core whereby said plastic components react to form a hardened photoelastic plastic on the bottom of said hole.

9. An apparatus for applying a plastic compound to the bottom of a hole comprising:
    (a) a wand;
    (b) a means for orienting the wand attached to said wand;
    (c) a cementing head connected to one end of said wand and containing a reservoir for said plastic compound; and
    (d) a tensioning means connected to said wand for forcing said cementing head against the bottom of said hole.

References Cited

UNITED STATES PATENTS 2,236,836    4/1941    Prutton _____ 166—13

RICHARD C. QUEISSER, *Primary Examiner.*

JERRY W. MYRACLE, *Assistant Examiner.*

U.S. Cl. X.R.

73—88